(12) United States Patent
Liang et al.

(10) Patent No.: US 12,238,769 B2
(45) Date of Patent: Feb. 25, 2025

(54) METHOD, DEVICE AND COMPUTER READABLE MEDIUM FOR CONTENTION WINDOW ADJUSTMENT

(71) Applicant: NEC CORPORATION, Tokyo (JP)

(72) Inventors: Lin Liang, Beijing (CN); Gang Wang, Beijing (CN)

(73) Assignee: NEC CORPORATION, Tokyo (JP)

(*) Notice: Subject to any disclaimer, the term of this patent is extended or adjusted under 35 U.S.C. 154(b) by 433 days.

(21) Appl. No.: 17/596,111

(22) PCT Filed: Jun. 6, 2019

(86) PCT No.: PCT/CN2019/090429
§ 371 (c)(1),
(2) Date: Dec. 3, 2021

(87) PCT Pub. No.: WO2020/243970
PCT Pub. Date: Dec. 10, 2020

(65) Prior Publication Data
US 2022/0256600 A1 Aug. 11, 2022

(51) Int. Cl.
*H04W 4/00* (2018.01)
*H04L 1/1812* (2023.01)
(Continued)

(52) U.S. Cl.
CPC ....... *H04W 74/0816* (2013.01); *H04L 1/1812* (2013.01); *H04L 5/0053* (2013.01);
(Continued)

(58) Field of Classification Search
CPC ......... H04W 74/0816; H04W 72/0446; H04W 72/0453; H04W 74/0866; H04L 1/1812; H04L 5/0053
See application file for complete search history.

(56) References Cited

U.S. PATENT DOCUMENTS 11,632,195 B2 * 4/2023 Salem ............... H04L 1/1854
370/329
2013/0138787 A1 5/2013 Wang
(Continued)

FOREIGN PATENT DOCUMENTS

CN 106301872 A 1/2017
CN 108029142 A 5/2018

OTHER PUBLICATIONS

Extended European Search Report issued May 30, 2022 in European Application No. 19932197.7.
(Continued)

*Primary Examiner* — Abdelnabi O Musa
(74) *Attorney, Agent, or Firm* — Sughrue Mion, PLLC

(57) ABSTRACT

Embodiments of the present disclosure relate to method, device and computer readable medium for contention window adjustment. In example embodiments, a method includes selecting, at least from first transmissions in a first time interval, a set of reference transmissions based on occupancy of a set of subbands by the first transmissions, clear channel assessment being performed on the set of subbands. The method further includes determining an unsuccessful reception ratio based on reception states of the set of reference transmissions. The method further includes determining, based on the unsuccessful reception ratio, an adjustment on a contention window for a second transmission in a second time interval after the first time interval.

6 Claims, 6 Drawing Sheets

(51) Int. Cl.
  *H04L 5/00* (2006.01)
  *H04W 72/0446* (2023.01)
  *H04W 72/0453* (2023.01)
  *H04W 74/08* (2009.01)
  *H04W 74/0816* (2024.01)
(52) U.S. Cl.
  CPC ... *H04W 72/0446* (2013.01); *H04W 72/0453* (2013.01); *H04W 74/0866* (2013.01)

(56) References Cited

U.S. PATENT DOCUMENTS

| | | | |
|---|---|---|---|
| 2014/0052843 A1 | 2/2014 | Goyal et al. | |
| 2016/0380834 A1 | 12/2016 | Peng et al. | |
| 2018/0254858 A1* | 9/2018 | He | H04L 1/0001 |
| 2020/0100284 A1* | 3/2020 | Li | H04L 1/1812 |
| 2020/0236709 A1* | 7/2020 | Park | H04W 74/0816 |
| 2020/0351847 A1* | 11/2020 | Kim | H04L 5/0094 |
| 2021/0127422 A1* | 4/2021 | Jiang | H04L 5/0055 |
| 2022/0085939 A1* | 3/2022 | Mondal | H04W 72/21 |
| 2022/0116150 A1* | 4/2022 | Kim | H04L 1/1812 |
| 2022/0132342 A1* | 4/2022 | Kim | H04W 74/0816 |
| 2022/0132563 A1* | 4/2022 | Kim | H04W 74/08 |
| 2023/0413324 A1* | 12/2023 | Li | H04L 5/0078 |

OTHER PUBLICATIONS

Nokia et al., "Feature Lead's Summary #2 on Channel Access Procedures", 3GPP TSG RAN WG1 Meeting #96bis, R1-1905766, Xian, China, Apr. 8-12, 2019 (21 pages total).

Lenovo et al., "Extensions for Channel Access Procedures", 3GPP TSG RAN WG#97, R1-1907086, Reno, USA, May 13-17, 2019 (3 pages total).

NTT Docomo, Inc., "Views on DL LBT mechanism and contention window size adaptation", 3GPP TSG RAN WG1 Meeting #82, R1-154403, Aug. 24-28, 2015, pp. 1-7, Beijing, China.

Intel Corporation, "Enhancements to channel access mechanism for NR-unlicensed", 3GPP TSG RAN WG1 Meeting #94bis, R1-1810766, Oct. 8-12, 2018, pp. 1-9, Chengdu, China.

Written Opinion for PCT/CN2019/090429, dated Mar. 9, 2020.

International Search Report for PCT/CN2019/090429, dated Mar. 9, 2020.

Japanese Office Action dated Apr. 4, 2023 in Japanese Application No. 2021-571976.

Zte et al., "Discussion on Channel Access Procedure for NR-U", 3GPP TSG RAN WG1 Meeting #97, R1-1905951, May 13-17, 2019, Reno, USA, pp. 1-12 (12 pages total).

Huawei et al., "Coexistence and Channel Access for NR Unlicensed Band Operations", 3GPP TSG RAN WG1 Meeting #97, R1-1906044, May 13-17, 2019, Reno, USA (21 pages total).

Oppo, "Channel Access Procedures for NR-U", 3GPP TSG RAN WG1 #97, R1-1906486, May 13-17, 2019, Reno, USA, pp. 2-7 (6 pages total).

Chinese Office Action dated Apr. 29, 2023 in Chinese Application No. 201980098817.8.

Lenovo, et al., "Extensions for Channel Access Procedures", 3GPP TSG RAN WG1#96bis, R1-1905183, Apr. 8-12, 2019, Xian, China (4 pages total).

Office Action issued Oct. 3, 2023 in Japanese Application No. 2021-571976.

\* cited by examiner

US 12,238,769 B2

METHOD, DEVICE AND COMPUTER READABLE MEDIUM FOR CONTENTION WINDOW ADJUSTMENT

This application is a National Stage of International Application No. PCT/CN2019/090429 filed Jun. 6, 2019.

TECHNICAL FIELD

Embodiments of the present disclosure generally relate to the field of communication, and in particular, to method, device and computer readable medium for contention window (CW) adjustment.

BACKGROUND

Communication technologies have been developed in various communication standards to provide a common protocol that enables different wireless devices to communicate on a municipal, national, regional, and even global level. An example of an emerging communication standard is new radio (NR), for example, 5G radio access. NR is a set of enhancements to the Long Term Evolution (LTE) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

Licensed-Assisted Access (LAA) has been approved by 3GPP as the solution for LTE offloading excessive traffic onto unlicensed 5 GHz band and Listen-before-talk (LBT) is adopted before channel access. LBT scheme works as a requisite in unlicensed band to ensure the fairness among different radio access technologies. For NR-Unlicensed (NRU), TR 38.889 defines LBT with random back-off with a contention window of variable size. CW adjustment or contention window size (CWS) adjustment is used for better coexistence of transmitting points on unlicensed band.

SUMMARY

In general, example embodiments of the present disclosure provide method, device and computer readable medium for CW adjustment.

In a first aspect, there is provided a method for communication. The method comprises selecting, at least from first transmissions in a first time interval, a set of reference transmissions based on occupancy of a set of subbands by the first transmissions, clear channel assessment being performed on the set of subbands. The method also comprises determining an unsuccessful reception ratio based on reception states of the set of reference transmissions. The method further comprises determining, based on the unsuccessful reception ratio, an adjustment on a contention window for a second transmission in a second time interval after the first time interval.

In a second aspect, there is provided a device for communication. The device includes a processor; and a memory coupled to the processing unit and storing instructions thereon, the instructions, when executed by the processing unit, causing the device to perform actions. The actions comprise selecting, at least from first transmissions in a first time interval, a set of reference transmissions based on occupancy of a set of subbands by the first transmissions, clear channel assessment being performed on the set of subbands. The actions also comprise determining an unsuccessful reception ratio based on reception states of the set of reference transmissions. The actions further comprise determining, based on the unsuccessful reception ratio, an adjustment on a contention window for a second transmission in a second time interval after the first time interval.

In a third aspect, there is provided a computer readable medium having instructions stored thereon, the instructions, when executed on at least one processor, causing the at least one processor to carry out the method according to the first aspect.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" or "base station" (BS) refers to a device which is capable of providing or hosting a cell or coverage where terminal devices can communicate. Examples of a network device include, but not limited to, a Node B (NodeB or NB), an Evolved NodeB (eNodeB or eNB), a NodeB in new radio access (gNB) a Remote Radio Unit (RRU), a radio head (RH), a remote radio head (RRH), a low power node such as a femto node, a pico node, and the like. For the purpose of discussion, in the following, some embodiments will be described with reference to gNB as examples of the network device.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

Figure 1:
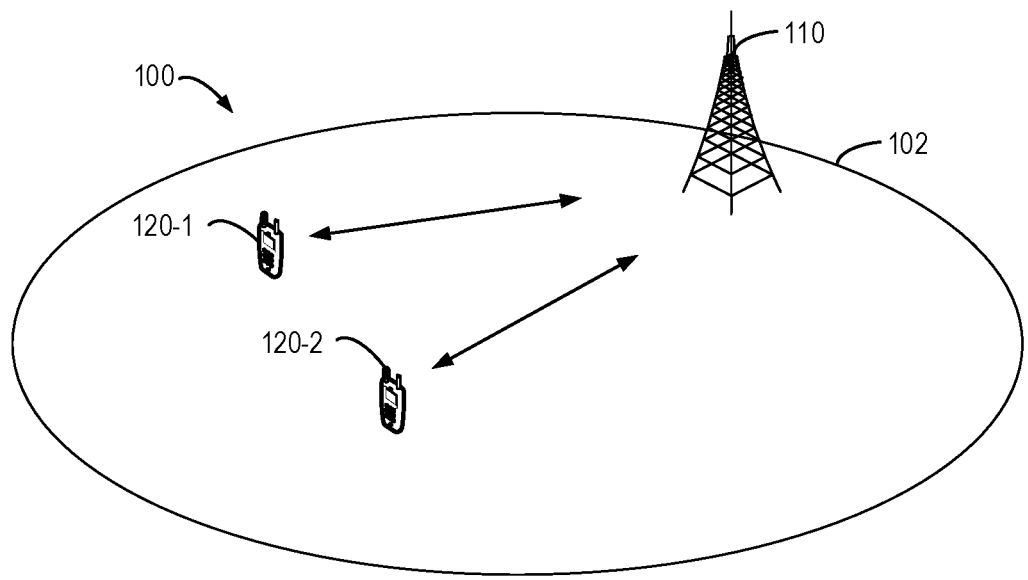
FIG. 1 is a schematic diagram of a communication environment in which some embodiments according to the present disclosure can be implemented.

FIG. 1 shows an example communication network 100 in which embodiments of the present disclosure can be implemented. The network 100 includes a network device 110, a terminal device 120-1 and a terminal device 120-2 (hereinafter collectively referred to as a terminal device 120) served by the network device 110. The serving area of the network device 110 is called as a cell 102. It is to be understood that the number of network devices and terminal devices is only for the purpose of illustration without suggesting any limitations. The network 100 may include any suitable number of network devices and terminal devices adapted for implementing embodiments of the present disclosure. Although not shown, it would be appreciated that one or more terminal devices may be in the cell 102 and served by the network device 120.

In the communication network 100, the network device 110 can communicate data and control information to the terminal device 120 and the terminal device 120 can also communication data and control information to the network device 110. A link from the network device 110 to the terminal device 120 is referred to as a downlink (DL) or a forward link, while a link from the terminal device 120 to the network device 110 is referred to as an uplink (UL) or a reverse link.

Depending on the communication technologies, the network 100 may be a Code Division Multiple Access (CDMA) network, a Time Division Multiple Address (TDMA) network, a Frequency Division Multiple Access (FDMA) network, an Orthogonal Frequency-Division Multiple Access (OFDMA) network, a Single Carrier-Frequency Division Multiple Access (SC-FDMA) network or any others. Communications discussed in the network 100 may use conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols. The techniques described herein may be used for the wireless networks and radio technologies mentioned above as well as other wireless networks and radio technologies. For clarity, certain aspects of the techniques are described below for LTE, and LTE terminology is used in much of the description below.

In the network 100, communications between the network device 110 and the terminal device 120 may be based on unlicensed band, and more particularly, based on unlicensed wide frequency bands. Although not shown, there may be other communication technologies in the communication network, for example, Wireless-Fidelity (Wi-Fi), which share the same unlicensed band. Wideband operations may be supported by means of for example bandwidth part (BWP) in the communication network 100.

The contention mechanism is one of the key components for efficient wideband operations. The contention mechanism requires a transmitting device to detect whether a channel is idle (i.e. available) or busy before it starts transmission to a receiving device. Such mechanism may be referred to as availability assessment, which is also called as a LBT procedure or a clear channel assessment (CCA) procedure. A contention window is maintained by the transmitting device to control a waiting duration before a transmission burst.

As mentioned above, CW adjustment or CWS adjustment is used for better coexistence of transmitting points on unlicensed band. For downlink CWS adjustment in NR-U, it has been proposed to use similar rules as those used for the uplink CWS adjustment for Autonomous Uplink (AUL) in feLAA (Further Enhanced LAA). Such solutions have certain drawbacks and do not take into account or utilize the characteristics of downlink transmissions. The difference between downlink and uplink CWS adjustment is that for uplink CWS adjustment, the terminal device (such as, UE) is not aware of when the network device (such as, a gNB) will schedule the transmission indicating new data indication (NDI) for CWS, while for downlink CWS adjustment, the network device has expectation on Hybrid Automatic Repeat reQuest Acknowledgement (HARQ-ACK) feedback from the terminal device even though the feedback may fail.

In LAA, the downlink CWS is determined based on the NACK ratio Z of the HARQ-ACKs for the TBs in the downlink reference subframe. Similarly, in NR-U the downlink CWS can be determined based on the NACK ratio Z of the HARQ-ACKs for the TBs in the downlink reference slot. However, mini-slot, feedback timing defined by downlink control indication (DCI), wideband operation are new features of NR-U, which may introduce new challenges in CWS adjustment. Therefore, there is a need to define the CWS adjustment for different use cases.

According to an example embodiment, there is provided a solution for contention window adjustment. In an example embodiment, a set of reference transmissions is first selected at least from a reference time interval, for example based on occupancy of a set of subbands, for example, a set of LBT subbands. An unsuccessful reception ratio is determined based on reception states of the set of reference transmissions. Then, the contention window for a further transmission or transmission burst is adjusted based on the unsuccessful reception ratio. In this way, flexible and accurate adjustment on the contention window especially for downlink transmission can be achieved.

Principle and example embodiments will now be described in detail below with reference to the accompanying drawings. However, those skilled in the art would readily appreciate that the detailed description given herein with respect to these drawings is for explanatory purpose as the present disclosure extends beyond theses limited embodiments.

Figure 2:
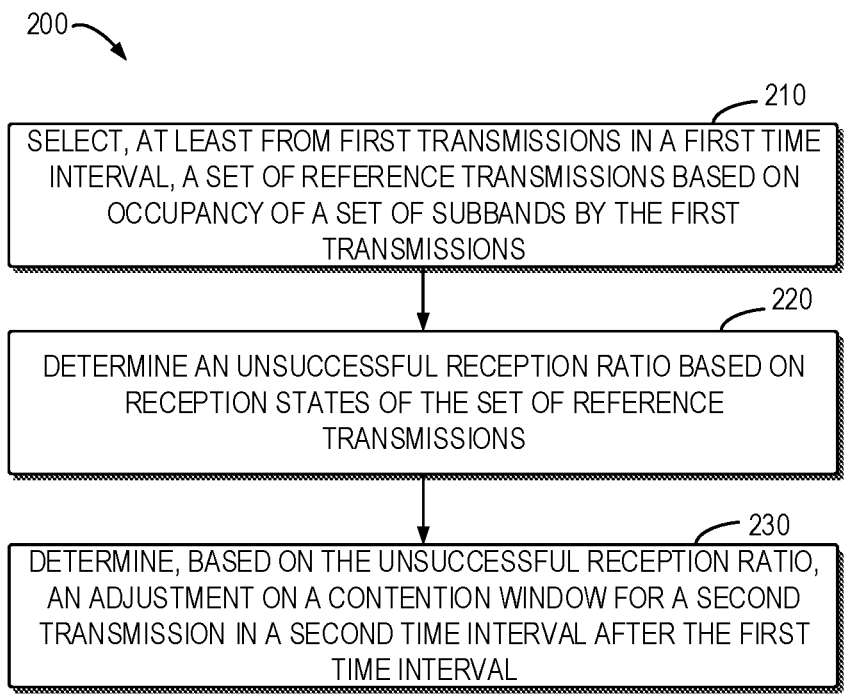
FIG. 2 illustrates a flowchart of an example method in accordance with some embodiments of the present disclosure.

FIG. 2 illustrates a flowchart of an example method 200 in accordance with some embodiments of the present disclosure. The method 200 can be implemented at the network device 110 shown in FIG. 1. It is to be understood that the method 200 may include additional blocks not shown and/or may omit some blocks as shown, and the scope of the present disclosure is not limited in this regard. For the purpose of discussion, the method 200 will be described with reference to FIG. 1.

At block 210, the network device 110 selects, at least from first transmissions in a first time interval, a set of reference transmissions based on occupancy of a set of subbands by the first transmissions. The network device 110 may perform CCA on the set of subbands, for example by means of LBT. Therefore, such a subband may be also referred to as a LBT subband herein. For example, when determining CWS adjustment for a DL burst n which may start at a certain timer interval (also referred to as a second time interval for ease of discussion), the network device 120 may take into account a previous DL burst m, which is also referred to as a reference burst or a reference DL burst. The reference burst may be the most recent transmission burst where at least one of HARQ-ACK feedback(s) for transmissions is expected to be available. The first time interval, which is also referred to as a reference time interval herein, may be the first slot of the reference burst.

For LAA in LTE, the reference point is the first subframe of a previous DL burst, and in this case all the PDSCH transmissions in the first subframe are taken into account when determining the NACK ratio Z (although reception states of some of the PDSCH transmissions may be ignored). Alternatively, the reference point may be the first subframe and the second subframe if the first subframe is a partial subframe. The reason for selecting the first subframe as the reference point is that the first subframe can be better coexistence with other systems, e.g. Wi-Fi where RTS and CTS signal can be configured. The collision between LAA and Wi-Fi may only occur at the first part of a transmission, and hence the decoding result of the first subframe is effective. When a partial subframe is transmitted, eNB has no chance to adjust its TBS and higher probability of NACK is expected. So, the first and second subframes are taken into account together.

While in NR-U, mini slot transmission is adopted and there is no need to adjust the MCS of PDSCHs based on LBT. Since a more flexible utilization of time and frequency resources, configurations of PDSCH transmissions in a single slot may be varied in NR-U. For a wideband PDSCH, LBT may be failed on a certain LBT subband and no transmission on that subband. As such, the PDSCH spanned on wideband has higher probability of NACK feedback in this case, but such a NACK feedback doesn't mean that the CW should be increased to a next higher level.

Figure 3:
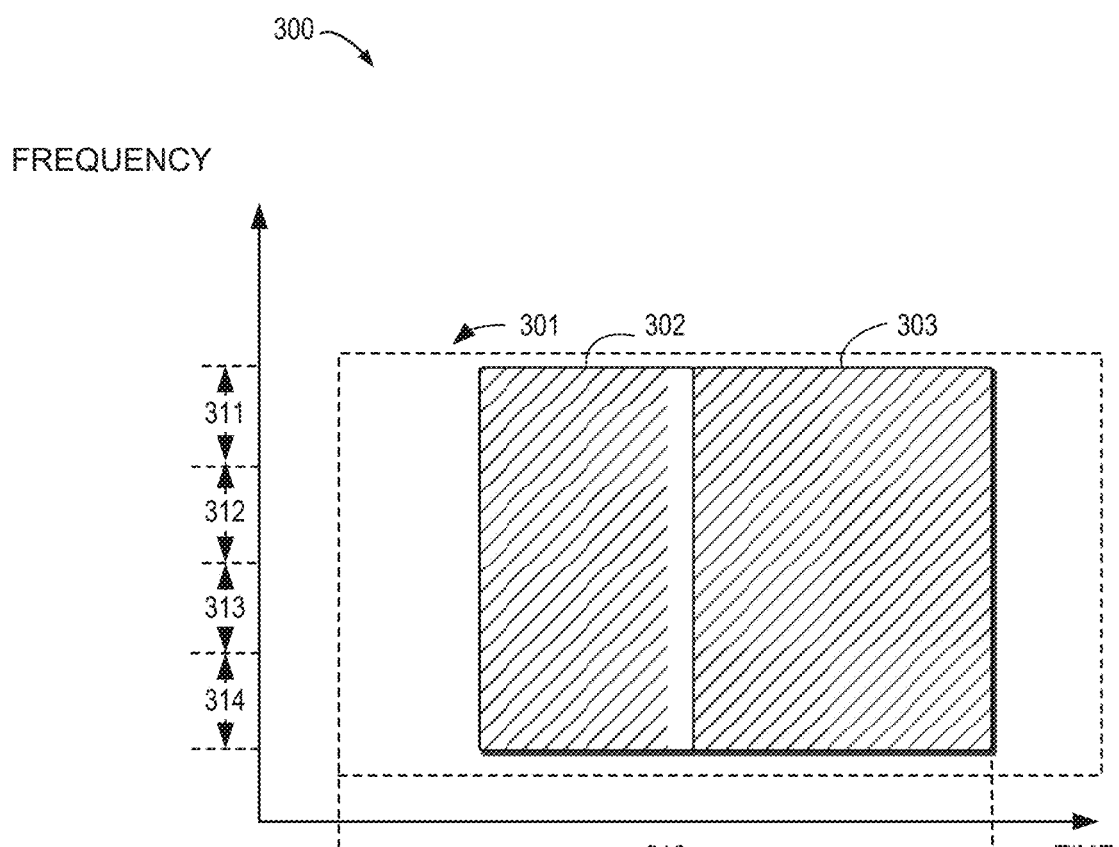
FIG. 3 shows a schematic diagram illustrating PDSCH transmissions in a reference slot according to some embodiments of the present disclosure.
Figure 4:
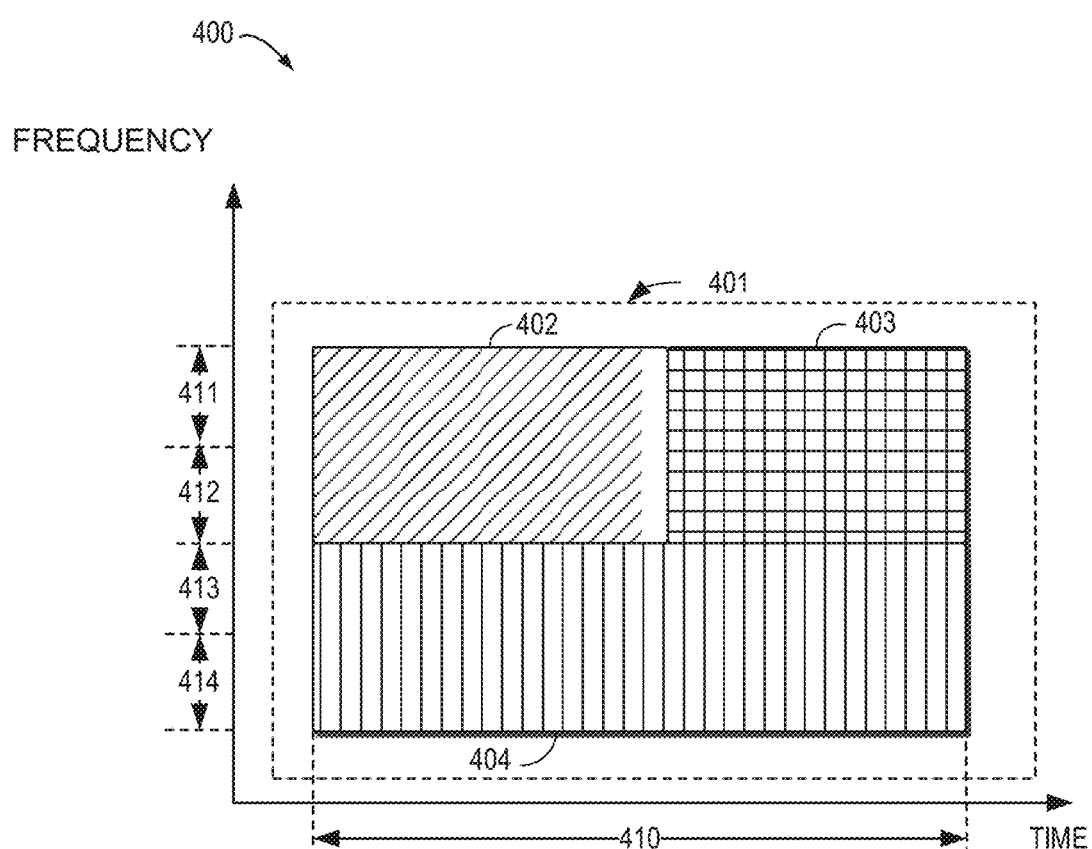
FIG. 4 shows a schematic diagram illustrating PDSCH transmissions in a reference slot according to some other embodiments of the present disclosure.
Figure 5:
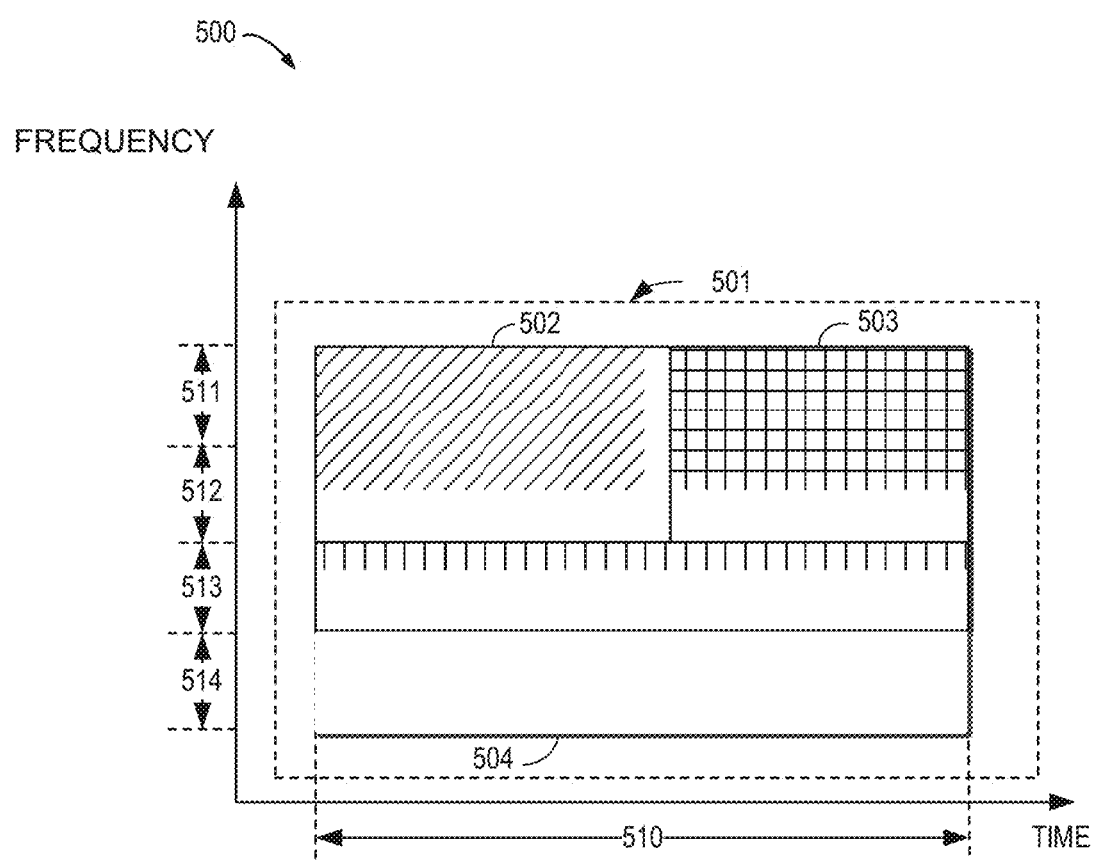
FIG. 5 shows a schematic diagram illustrating PDSCH transmissions in a reference slot according to some other embodiments of the present disclosure.

Now reference is made to FIGS. 3-5, which show some example reference slots and example PDSCH transmissions.

FIG. 3 shows a schematic diagram 300 illustrating PDSCH transmissions in a reference slot 310 according to some embodiments of the present disclosure. As shown in FIG. 3, the reference slot 310, i.e. the first slot of the DL burst 301, comprises two PDSCH transmissions 302 and 303 (which may be considered as the first transmissions as mentioned above). In this example, the PDSCH transmissions 302 and 303 are transmitted to a same terminal device 120, for example the terminal device 120-1 as shown in FIG. 1. Prior to the DL burst 301, LBT is performed on the subbands 311-314, which is also called LBT subbands 311-314.

FIG. 4 shows a schematic diagram 400 illustrating PDSCH transmissions in a reference slot 410 according to some other embodiments of the present disclosure. As shown in FIG. 4, the reference slot 410, i.e. the first slot of the DL burst 401, comprises three PDSCH transmissions 402, 403 and 404 (which may be considered as the first transmissions as mentioned above). In this example, the PDSCH transmissions 402, 403 and 404 are transmitted to three terminal devices, for example, the PDSCH transmission 402 for the terminal device 120-1, the PDSCH transmission 403 for the terminal device 120-2 as shown in FIG. 1 and the PDSCH transmission 404 for a further terminal device not shown. Prior to the DL burst 401, LBT is performed on the subbands 411-414, which is also called LBT subbands 411-414.

FIG. 5 shows a schematic diagram 500 illustrating PDSCH transmissions in a reference slot 510 according to some other embodiments of the present disclosure. As shown in FIG. 5, the reference slot 510, i.e. the first slot of the DL burst 501, comprises three PDSCH transmissions 502, 503 and 504 (which may be considered as the first transmissions as mentioned above). In this example, the PDSCH transmissions 502, 503 and 504 may be transmitted to a same terminal device or to different terminal devices. Prior to the DL burst 501, LBT is performed on the subbands 511-514, which is also called LBT subbands 511-514. As shown in FIG. 5, the PDSCH transmission 504 is a partial transmission or a punctured transmission. LBT subband 514 may be allocated for the PDSCH transmission 504 but is not occupied by the PDSCH transmission 504 due to for example LBT failure on the subband 514.

In FIGS. 3-5, the DL bursts 301, 401 and 501 are shown in dashed lines. It is to be understood that these bursts may span over a plurality of slots in addition to the first slots as shown and that these bursts may comprise other transmissions in addition to the PDSCH transmissions as shown. It is to be understood that the PDSCH transmissions in FIGS. 3-5 are only for purpose of illustration and there may be more PDSCH transmissions in the each of the slots 310, 410 and 510. As shown in FIGS. 3-5, resource allocation in NU-R is more flexible and thus the definition of reference point should be clarified.

In some example embodiments, the network device 110 may determine whether a partial transmission is present in the first transmissions, in other word in the first time interval. The partial transmission fails to use at least an allocated subband in the set of subbands, for example a set of LBT subbands. If the partial transmission is present in the first transmissions, the network device 110 may determine the set of reference transmissions based on the first transmissions in the first time interval and at least one third transmission in a third time interval immediately after the first time interval.

Now reference is made to FIG. 5. As mentioned above, the PDSCH transmission 504 fails to use the LBT subband 514 due to for example LBT failure, resulting in a partial transmission or a punctured transmission. In this example, all the PDSCH transmissions in both the first slot 510 and the next slot (not shown) immediately after the first slot 510 may be selected by the network device 110 as the set of reference transmissions. In other word, for the case where a PDCSH is not transmitted on at least one LBT subband due to LBT failure, all the PDSCH transmissions in both the first slot 510 and the next slot may be considered as reference points. In such example embodiments, the effect of the partial or punctured transmission on the CSW adjustment can be reduced.

In some cases, the partial transmission is absent in the first transmissions, such as, the examples shown in FIG. 3 and FIG. 4. In some example embodiments, if the partial transmission is absent in the first transmissions, the network device 110 may determine all of the first transmissions as the set of reference transmissions. For the example shown in FIG. 3, the network device 110 may determine all the PDSCH transmissions 302 and 303 in the reference slot 310 as the set of reference transmissions. For the example shown in FIG. 4, the network device 110 may determine all the PDSCH transmissions 402, 403 and 404 in the reference slot 410 as the set of reference transmissions. In other words, in such example embodiments, for the cases where partial PDSCH transmission is absent in the reference slot or the first slot of reference burst, all the PDSCH transmissions in the reference slot may be considered as reference points.

In some example embodiments, if the partial transmission is absent in the first transmissions, the network device 110 may determine a starting transmission in the first transmissions and determine the set of reference transmissions at least based on the starting transmission. For example, the network device 110 may determine transmissions with the earliest starting symbol as the set of reference transmissions.

Reference is now made to FIG. 4. In this example, the PDSCH transmissions 402 and 404 with the earliest starting symbol in the reference slot 410 may be determined as starting transmissions. As a result, PDSCH transmissions 402 and 404 may be selected as the set of reference transmissions. In other words, in such example embodiments, the PDSCH transmissions with the earliest starting symbol in the reference slot may be considered as reference points.

Referring back to FIG. 2, at block 220, the network device 110 determines an unsuccessful reception ratio based on reception states of the set of reference transmissions. The unsuccessful reception ratio may be for example the NACK ratio Z. For example, the network device 110 may determine the reception states by detecting the HARQ-ACK feedbacks for the reference transmissions. If an 'ACK' feedback is received for a certain reference transmission, then reception state of that transmission is a successful reception state. If a 'NACK' feedback is received for another reference transmission, then reception state of that transmission is an unsuccessful reception state. For the example shown in FIG. 4, if the HARQ-ACK feedback for the PDSCH transmission 402 is 'ACK', the PDSCH transmission 402 is considered as successfully received. If the HARQ-ACK feedback for the PDSCH transmission 403 is 'NACK', the PDSCH transmission 403 is considered as unsuccessfully received.

In some cases, for a reference transmission, the network device 110 may determine an uncertain state for the reference transmission. As used herein, the term "uncertain state" of a transmission means that no HARQ-ACK feedback is detected for the transmission by the network device 1120, or the network device 110 detects 'DTX' (short for discontinuous transmission), 'NACK/DTX' or 'any' state. For determining the unsuccessful reception ratio, how to handle the transmission with the uncertain state need to be defined.

In some example embodiments, if a reception state of a reference transmission in the set of reference transmissions is the uncertain state, the network device 110 may determine whether a resource indication for a HARQ-ACK feedback corresponding to the reference transmission is transmitted on a licensed band or on an unlicensed band. If the resource indication is transmitted on the unlicensed band, then the network device 110 may set the reception state as an unsuccessful reception state. If the resource indication is transmitted on the licensed band, then this reception state may be ignored by the network device 110.

Taking the PDSCH transmission 404 shown in FIG. 4 as an example, the network device 110 may determine an uncertain state based on a detection of the HARQ-ACK feedback for the PDSCH transmission 404. If the PDCCH carrying the DCI for the HARQ-ACK feedback is transmitted on the licensed band, then the uncertain state of the PDSCH transmission 404 may be ignored by the network device 110 in determining the NACK ratio Z. If the PDCCH is transmitted on the unlicensed band, the uncertain state of the PDSCH transmission 404 is counted as 'NACK' by the network device 110 in determining the NACK ratio Z, regardless of where the HARQ-ACK feedback is transmitted.

In some example embodiments, the network device 110 may further take into account the band on which the HARQ-ACK feedback is transmitted. For example, if the PDCCH is transmitted on the unlicensed band and the HARQ-ACK feedback is transmitted on the licensed band, the uncertain state may be set as an unsuccessful reception state or in other word counted as 'NACK'.

For the cases where both the PDCCH and the HARQ-ACK feedback are transmitted on the unlicensed band, different approaches may be adopted by the network device 110. In some example embodiments, the uncertain state may be set as an unsuccessful reception state or in other word counted as 'NACK'.

In some example embodiments, the uncertain state may be ignored by the network device 110 in determining the unsuccessful reception state. Additionally, or alternatively, the network device 110 may indicate a plurality of occasions for reception state feedback associated with a reference transmission in the set of reference transmissions and the plurality of reception states are uncertain states. If the number of the plurality of uncertain reception states exceeds a predetermined number N, the network device 110 may set the reception state as an unsuccessful reception state. As such, the reception state of that reference transmission is counted as 'NACK'.

Still taking the PDSCH transmission 404 shown in FIG. 4 as an example, N PDCCH orders (e.g., DCIs) have been indicated for (re)transmission HARQ-ACK bits corresponding to the PDSCH transmission 404. If the network device 110 determines the uncertain state for N times, then the reception state of the PDSCH transmission 404 may be counted as 'NACK'.

In some example embodiments, the LBT type for the HARQ-ACK feedback may be taken into account by the network device 110. If a reception state of a reference transmission in the set of reference transmissions is an uncertain state, the network device 110 may determine an LBT type for a HARQ-ACK feedback corresponding to the reference transmission. If the LBT type is a predetermined type, the network device 110 may set the reception state as an unsuccessful reception state. If the LBT type is not the predetermined type, the network device 110 may ignore the reception state of the reference transmission.

Still taking the PDSCH transmission 404 shown in FIG. 4 as an example, for purpose of discussion, it is assumed that the PDSCH transmission 404 is transmitted to the terminal device 120-1 as shown in FIG. 1. If the reception state of the PDSCH transmission 404 is determined as the uncertain state, the network device 110 may determine the LBT type used by the terminal device 120-1 to transmit the HARQ-ACK feedback on the unlicensed band. If the LBT type for the HARQ-ACK for corresponding to the PDSCH transmission 404 is cat 2, the uncertain state of the PDSCH transmission 404 may be counted as 'NACK'. If the LBT type for the HARQ-ACK for corresponding to the PDSCH transmission 404 is cat 4, the uncertain state of the PDSCH transmission 404 may be ignored by the network device 110.

In this way, the reception state of the reference transmissions can be determined as 'ACK', 'NACK' or may be ignored. The network device 110 may determine the unsuccessful reception ratio based on the determined reception states.

Referring back to FIG. 2, at block 230, the network device 110 determines, based on the unsuccessful reception ratio, an adjustment on a contention window for a second transmission in a second time interval after the first time interval. For example, the network device 110 may adjust the contention window for a DL burst based on the NACK ratio Z of the reference burst.

Figure 6:
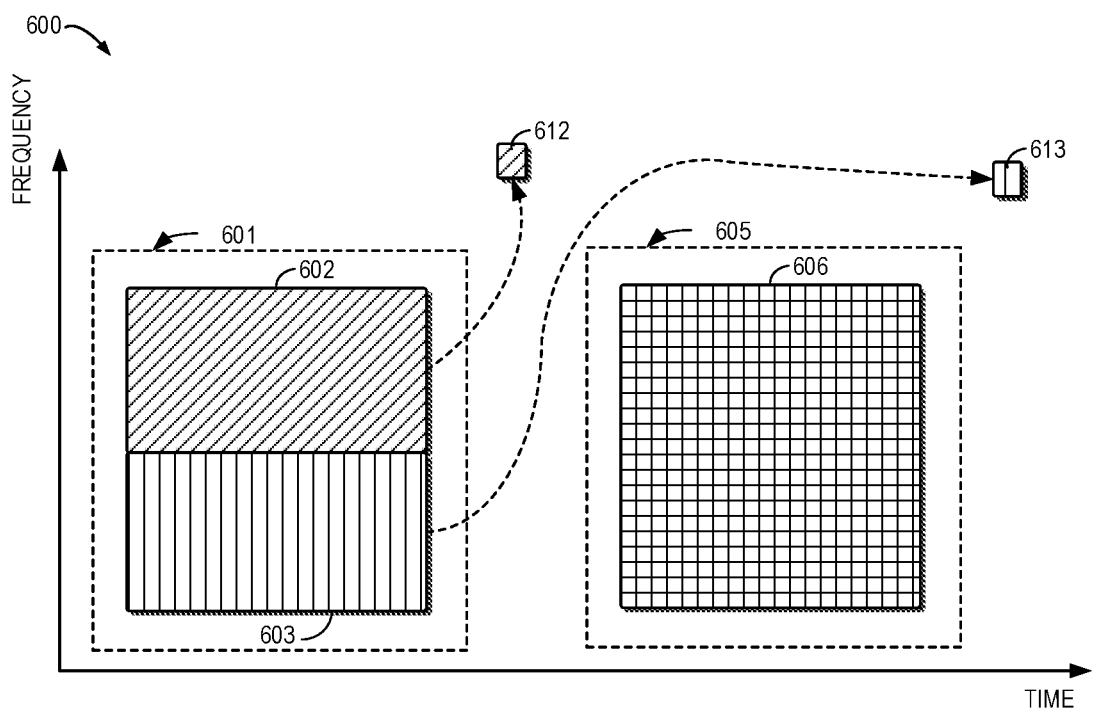
FIG. 6 shows a schematic diagram illustrating two transmission bursts according to some embodiments of the present disclosure.

Reference is now made to FIG. 6, which shows a schematic diagram 600 illustrating two DL bursts 601 and 605 according to some embodiments of the present disclosure. The DL burst 605 is located after the DL burst 601 in time domain and the burst 601 is a reference burst for the burst 605. In this example, the contention window for the burst 605 may be adjusted based on the unsuccessful reception ratio (for example, the NACK ratio Z) of the reference transmissions in the burst 601, for example, the PDSCH transmissions 602 and 603 as shown and other PDSCH transmissions not shown.

In some example embodiments, the network device 110 determines whether the unsuccessful ratio exceeds a threshold ratio (for example 80%). If the unsuccessful ratio exceeds the threshold ratio, then a size of the contention window may be increased. If the unsuccessful ratio is below the threshold ratio, the size of the contention window may be set to be a minimum size. For example, if the NACK ratio Z for the burst 601 is determined to exceed the threshold size, the size of the contention window for the burst 605 may be increased to next higher allowed value for every priority class. If the NACK ratio Z for the burst 601 is determined to be below the threshold size, the size of the contention window for the burst 605 may be set as the minimum size or reset.

In NR-U, different terminal devices may have different HARQ timing. Meanwhile, the expected HARQ-ACK feedback may not be transmitted due to LBT and would be retransmitted in the next occasions. Just as an example, the PDSCH transmissions 602 and 603, which are transmitted to two different terminal devices (e.g. the terminal device 120-1 and the terminal device 120-2) respectively, are reference transmissions of reference points. The resource 612 may be indicated for transmitting the HARQ-ACK feedback corresponding to the PDSCH transmission 602 and the resource 613 may indicated for transmitting the HARQ-ACK feedback corresponding to the PDSCH transmission 603. In this situation, the HARQ-ACK feedback for the PDSCH transmission 603 may be received after the DL burst 605. Therefore, there is a need to handle this HARQ timing issue when adjusting the CWS.

Generally, the HARQ-ACK feedback of a previous DL burst m may be updated, which may be caused by for example HARQ-ACK feedback for another PDSCH from another terminal device or by retransmission of HARQ-ACK feedback on PUCCH or by N times determination of uncertain state as mentioned above. Adjustment on the CW of a DL burst n after the previous burst m may depend on the HARQ-ACK feedback of the previous DL burst m. In this case, the CWS of the DL burst n may be reverted based on the updated HARQ-ACK feedback of downlink burst m, and thus the CWS for a sequence of transmission bursts after the burst n may be updated sequentially.

In some example embodiments, another ratio may be introduced to handle this HARQ timing issue. For example, the size of the contention window may be adjusted until a threshold ratio of HARQ-ACK feedbacks corresponding to the reference transmissions in the set of reference transmissions have been received. The network device 110 may receive a first number of feedbacks for the first number of reference transmissions and determine a feedback ratio of the first number to a total number of reference transmissions in the set of reference transmissions. If the feedback ratio exceeds a threshold feedback ratio, the network device 110 may determine the reception states of the first number of reference transmissions based on the first number of feedbacks which have been received, and determines the unsuccessful reception ratio based on the determined reception states.

As an example, the total number of reference PDSCH transmissions in the burst 601 may be represented as N0. At a certain time, the network device 110 may have received N1 HARQ-ACK feedbacks for N1 reference PDSCH transmissions. Then the feedback ratio may be determined as N1/N0. If the feedback ratio N1/N0 exceeds the threshold feedback ratio, the network device 110 may adjust the size of the contention window for the burst 605 based on the N1 HARQ-ACK feedbacks which have been received by the network device 110.

In such example embodiments, the network device 110 will wait until the threshold ratio of HARQ-ACK feedbacks have been received. In this case, the CWS may be adjusted only once even if the rest HARQ-ACK feedbacks would be received and the unsuccessful reception ratio would be changed.

In some example embodiments, if the feedback ratio of the HARQ-ACK feedbacks that have been received does not exceed the threshold feedback ratio, the network device 110 may directly increase the size of the contention window, for example for the burst 605. When HARQ-ACK feedbacks equal to or greater than the threshold feedback ratio have been received, the network device 110 may update the CWS based on the updated unsuccessful reception ratio, for example, updated NACK ratio Z for the burst 601.

As mentioned above, wideband operation is supported in NR-U. For wideband operation, the CWS adjustment may be performed per LBT subband and each PDSCH transmission overlapped with or occupying a certain LBT subband would be taken into account for the CWS adjustment for that subband. Still referring to FIG. 5, as a partial transmission or punctured transmission, the PSCDH transmission 504 is overlapped with the subband 513 and is not transmitted on the LBT subband 514 which otherwise should be occupied by the PSCDH transmission 504. The LBT subband 514 may be allocated for the PDSCH transmission 504 but the PDSCH transmission 504 fails to use the LBT subband 514 due to failure of LBT on that subband. In such a case, for the CWS adjustment for the subband 513, how to handle the reception state of the partial transmission 504 needs to be defined.

In some example embodiments, the HARQ-ACK feedbacks for such a partial transmission may be ignored in the CWS adjustment. If there is at least one complete transmission, then the unsuccessful reception ratio may be determined based on the reception states of the at least one complete transmission and the reception state of the is partial transmission may be ignored. If there are only partial transmissions without a complete transmission, then the unsuccessful reception ratio may be determined based on the reception states of these partial transmissions. In such a case, even if the unsuccessful reception ratio exceeds the threshold ratio, the size of the contention window may not be adjusted. If the unsuccessful reception ratio is below the threshold ratio, the size of the contention window may be set to be the minimum size.

In some example embodiments, in order to reduce the affect of the partial transmission for which the HARQ-ACK feedback has a high probability of NACK, the transmission in the next time interval (for example, the next slot) may be also taken into account in determining the unsuccessful ratio, similarly as mentioned above.

Such an approach of partial transmission and complete transmission may also be applied to the determination of reference points. In some example embodiments, the network device 110 may determine whether a partial transmission is present in the first transmissions and the partial transmission fails to use at least an allocated subband in the set of subbands. If the partial transmission is present, the network device 110 may determine whether a complete transmission is present in the first transmissions and the complete transmission uses all subbands allocated for the complete transmission in the set of subbands. If the complete transmission is present, the network device 110 may determine the set of reference transmission based on the complete transmission, and the set of reference transmission excludes the partial transmission.

If the complete transmission is absent, the network device 110 may determine all of the first transmissions as the set of reference transmissions. In such a case, if the unsuccessful reception ratio exceeds the threshold ratio, the size of the contention window may not be adjusted.

Figure 7:
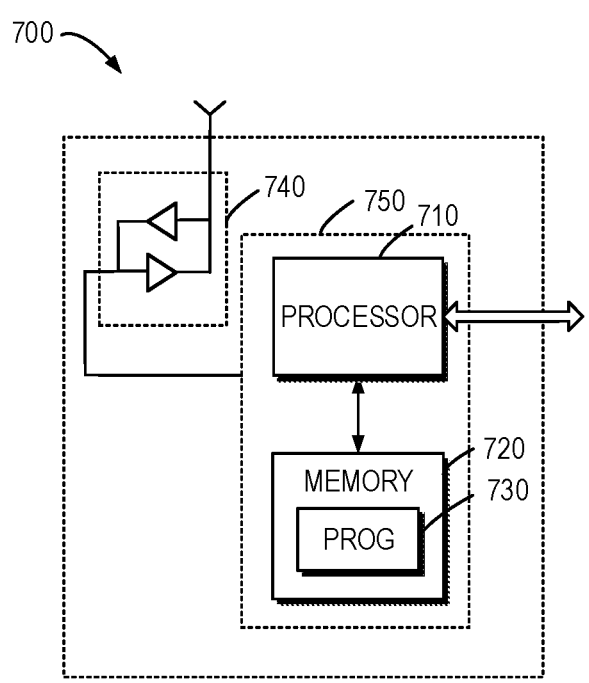
FIG. 7 is a simplified block diagram of a device that is suitable for implementing embodiments of the present disclosure.

FIG. 7 is a simplified block diagram of a device 700 that is suitable for implementing embodiments of the present disclosure. The device 700 can be considered as a further example implementation of the network device 110 or the terminal device 120 as shown in FIG. 1. Accordingly, the device 700 can be implemented at or as at least a part of the network device 110 or the terminal device 120.

As shown, the device 700 includes a processor 710, a memory 720 coupled to the processor 710, a suitable transmitter (TX) and receiver (RX) 740 coupled to the processor 710, and a communication interface coupled to the TX/RX 740. The memory 710 stores at least a part of a program 730. The TX/RX 740 is for bidirectional communications. The TX/RX 740 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 730 is assumed to include program instructions that, when executed by the associated processor 710, enable the device 700 to operate in accordance with the embodiments of the present disclosure, as discussed herein with reference to FIGS. 2-6. The embodiments herein may be implemented by computer software executable by the processor 710 of the device 700, or by hardware, or by a combination of software and hardware. The processor 710 may be configured to implement various embodiments of the present disclosure. Furthermore, a combination of the processor 710 and memory 710 may form processing means 750 adapted to implement various embodiments of the present disclosure.

The memory 710 may be of any type suitable to the local technical network and may be implemented using any suitable data storage technology, such as a non-transitory computer readable storage medium, semiconductor-based memory devices, magnetic memory devices and systems, optical memory devices and systems, fixed memory and removable memory, as non-limiting examples. While only one memory 710 is shown in the device 700, there may be several physically distinct memory modules in the device 700. The processor 710 may be of any type suitable to the local technical network, and may include one or more of general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIG. 2. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method performed by a network device, the method comprising:
   determining a hybrid automatic repeat request acknowledgement (HARQ-ACK) feedback corresponding to at least one physical downlink shared channel (PDSCH) transmission in a reference duration for which the HARQ-ACK feedback is available; and
   performing contention window adjustment based on the HARQ-ACK feedback,
   wherein the reference duration comprises at least one first PDSCH transmission transmitted over all allocated resources, or the reference duration comprises at least one second PDSCH transmission transmitted not over all the allocated resources, and
   wherein the reference duration comprises the at least one second PDSCH transmission transmitted not over all the allocated resources, in a case where the reference duration does not include any PDSCH transmission transmitted over all the allocated resources.

2. The method of claim 1, wherein a transmission burst comprises the at least one second PDSCH transmission.

3. The method of claim 1, wherein a transmission burst comprises the at least one first PDSCH transmission.

4. A network device comprising a processor configured to:
   determine a hybrid automatic repeat request acknowledgement (HARQ-ACK) feedback corresponding to at least one physical downlink shared channel (PDSCH) transmission in a reference duration for which the HARQ-ACK feedback is available; and
   perform contention window adjustment based on the HARQ-ACK feedback,
   wherein the reference duration comprises at least one first PDSCH transmission transmitted over all allocated resources, or the reference duration comprises at least one second PDSCH transmission transmitted not over all the allocated resources, and
   wherein the reference duration comprises the at least one second PDSCH transmission transmitted not over all the allocated resources, in a case where the reference duration does not include any PDSCH transmission transmitted over all the allocated resources.

5. The network device of claim 4, wherein a transmission burst comprises the at least one second PDSCH transmission.

6. The network device of claim 4, wherein a transmission burst comprises the at least one first PDSCH transmission.

* * * * *